US010493317B2

(12) United States Patent
Chen et al.

(10) Patent No.: US 10,493,317 B2
(45) Date of Patent: Dec. 3, 2019

(54) OMNIDIRECTIONAL MOTION METHOD, APPARATUS AND SYSTEM

(71) Applicants: BOE TECHNOLOGY GROUP CO., LTD., Beijing (CN); BEIJING BOE DISPLAY TECHNOLOGY CO., LTD., Beijing (CN)

(72) Inventors: Pengming Chen, Beijing (CN); Weitao Chen, Beijing (CN); Bin Zhang, Beijing (CN); Dianzheng Dong, Beijing (CN); Kan Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/563,512

(22) PCT Filed: Apr. 18, 2017

(86) PCT No.: PCT/CN2017/080883
§ 371 (c)(1),
(2) Date: Sep. 29, 2017

(87) PCT Pub. No.: WO2018/018942
PCT Pub. Date: Feb. 1, 2018

(65) Prior Publication Data

US 2019/0134457 A1 May 9, 2019

(30) Foreign Application Priority Data

Jul. 28, 2016 (CN) .......................... 2016 1 0609325

(51) Int. Cl.
*A63B 22/02* (2006.01)
*G06F 3/01* (2006.01)

(52) U.S. Cl.
CPC .............. *A63B 22/02* (2013.01); *G06F 3/011* (2013.01); *A63B 2022/0271* (2013.01); *A63B 2022/0278* (2013.01); *G06F 2203/012* (2013.01)

(58) Field of Classification Search
CPC ........................................................ G06F 3/011
(Continued)

(56) References Cited

U.S. PATENT DOCUMENTS 5,562,572 A * 10/1996 Carmein .................. A61H 3/00 482/4
6,050,822 A * 4/2000 Faughn .................. G06F 3/011 345/952
(Continued)

FOREIGN PATENT DOCUMENTS

CN 104667488 A 6/2015
CN 205042034 U 2/2016
CN 105617605 A 6/2016

OTHER PUBLICATIONS

Improvements in the Omni-Directional Treadmill: Summary Report and Recommendations for Future Development by Harrison P. Crowell III, Jim A. Faughn, Oct. 2006.*
(Continued)

*Primary Examiner* — Javid A Amini
(74) *Attorney, Agent, or Firm* — Syncoda LLC; Feng Ma

(57) ABSTRACT

A method of realizing an omnidirectional motion includes: detecting a pace of an object moving over an omnidirectional motion platform; decomposing the pace of the object into speeds along at least two directions; and driving at least two pluralities of movable members, based on the speeds along the at least two directions, to translocate the object along one of the at least two directions and in a direction opposite to a corresponding speed of the pace of the object such that the object remains at a substantially same place
(Continued)

over the omnidirectional motion platform. An omnidirectional motion apparatus includes an omnidirectional motion platform, and a pace detector and a data processor.

12 Claims, 12 Drawing Sheets

(58) Field of Classification Search
USPC .......................................................... 345/633
See application file for complete search history.

(56) References Cited

U.S. PATENT DOCUMENTS 6,123,647 A * 9/2000 Mitchell ................ A63B 22/02 198/456
6,152,854 A * 11/2000 Carmein .............. A63B 22/025 482/4
6,552,698 B1 * 4/2003 Walker ................. G02B 27/017 345/7
7,399,258 B1 * 7/2008 Sugar ................. A63B 22/0235 482/51
7,780,573 B1 * 8/2010 Carmein ............ A63B 22/0242 482/4
7,918,767 B1 * 4/2011 Wilson ................. A63B 21/153 482/45
2007/0270285 A1 * 11/2007 Gill ........................ A63B 22/02 482/54
2012/0302408 A1 * 11/2012 Burger ............... A63B 21/0087 482/54
2015/0070274 A1 * 3/2015 Morozov .............. G06F 3/0346 345/156
2018/0224930 A1 * 8/2018 Folmer ................. A63F 13/211

OTHER PUBLICATIONS

International Search Report and Written Opinion in PCT/CN2017/080883 dated Jul. 20, 2017.
1st Office Action dated Oct. 30, 2017 in CN201610609325.9.

* cited by examiner

OMNIDIRECTIONAL MOTION METHOD, APPARATUS AND SYSTEM

CROSS-REFERENCE TO RELATED APPLICATION

The present application claims priority to Chinese Patent Application No. 201610609325.9 filed on Jul. 28, 2016, the disclosure of which is hereby incorporated by reference in its entirety.

TECHNICAL FIELD

The present disclosure relates generally to the field of fitness and gaming equipment, and more specifically relates to a method of realizing an omnidirectional motion, an omnidirectional motion apparatus, and a motion system comprising the omnidirectional motion apparatus.

BACKGROUND

Virtual reality (VR) and augmented reality (AR) technologies have brought the emergence of new equipment and technical solutions in many different applications, such as in fitness, gaming, human rehabilitation, training and exercise. For example, a treadmill can be integrated with VR technologies such that a user can enjoy sceneries while exercising.

SUMMARY

The inventors of the present disclosure have recognized that, on a conventional treadmill, a user cannot move freely in all directions, thereby hindering the user's VR experience.

The present disclosure provides a method of realizing an omnidirectional motion, an omnidirectional motion apparatus, and a motion system comprising the omnidirectional motion apparatus, which can be better integrated with the virtual reality where a body of a user can move in any direction and at different speeds as the user perceives through the VR or AR technologies.

In a first aspect, a method of realizing an omnidirectional motion is disclosed herein. The method comprises:

detecting a pace of an object moving over an omnidirectional motion platform;

decomposing the pace of the object into speeds along at least two directions; and driving at least two pluralities of movable members, based on the speeds along the at least two directions, to translocate the object along one of the at least two directions and in a direction opposite to a corresponding speed of the pace of the object such that the object remains at a substantially same place over the omnidirectional motion platform.

In the method as described above, the object can be a human, an animal, or a machine, such as a robot, a moving mechanic object, etc. The pace of the object can be decomposed into two directions, but can also be decomposed into more than two directions.

In some embodiments of the method, the speeds along the at least two directions comprise a first speed along a first direction and a second speed along a second direction, wherein the second direction is not parallel with the first direction.

Accordingly, the at least two pluralities of movable members comprise a plurality of first movable members and a plurality of second movable members, wherein the plurality of first movable members are configured to translocate the object along the first direction and in a direction opposite to the first speed; and the plurality of second movable members are configured to translocate the object along the second direction and in a direction opposite to the second speed.

In the aforementioned embodiments of the method, the driving a plurality of movable members of the omnidirectional motion platform to translocate the object based on the speeds along the at least two directions can comprise: alternately performing:

driving the plurality of first movable members to translocate the object along the first direction and in a direction opposite to the first speed for a first time period; and driving the plurality of second movable members to translocate the object along the second direction and in a direction opposite to the second speed for a second time period.

In the aforementioned embodiments of the method, the first direction and the second direction can be perpendicular to each other.

As such, in the driving the plurality of first movable members to translocate the object along the first direction and in a direction opposite to the first speed for a first time period, the plurality of first movable members can be driven to translocate the object at a speed of 2V*cos, and in the driving the plurality of second movable members to translocate the object along the second direction and in a direction opposite to the second speed for a second time period, the plurality of second movable members can be driven to translocate the object at speed of 2V*sin i;

Herein V is the pace of the object, a is an angle between a direction of the pace of the object and the first direction, wherein, $0 \leq \alpha \leq 90$ d; and the first time period and the second time period are substantially same.

In some embodiments of the method, at least one of each first movable member and each second movable member can comprise a spherical body, which is configured to move over the omnidirectional motion platform to thereby translocate the object thereon.

According to some embodiments, each first movable member can comprise a spherical body, and each second movable member can comprise a spherical body.

As such, the driving a plurality of movable members of the omnidirectional motion platform to translocate the object based on the speeds along the at least two directions comprises: alternately driving the spherical bodies to move along the first direction in a direction opposite to the first speed and to move along the second direction in a direction opposite to the second speed.

In some other embodiments of the method, at least one of each first movable member and each second movable member can comprise a track, and a portion of the track is configured to move over the omnidirectional motion platform to thereby translocate the object in contact therewith.

According to some embodiments, each first movable member can comprise a first track, and each second movable member can comprise a second track.

As such, the driving the plurality of first movable members to translocate the object along the first direction and in a direction opposite to the first speed for a first time period further comprises: manipulating the first tracks and the second tracks such that the first tracks, but not the second tracks, can contact the object, and the driving the plurality of second movable members to translocate the object along the second direction and in a direction opposite to the second speed for a second time period further comprises: manipulating the first tracks and the second tracks such that the second tracks, but not the first tracks, can contact the object.

In the embodiments of the method as described above, the manipulating the first tracks and the second tracks can comprise: moving the first tracks and the second tracks along a third direction, wherein the third direction are perpendicular to the first direction and the second direction.

In a second aspect, the present disclosure further provides an omnidirectional motion apparatus. The omnidirectional motion apparatus comprises an omnidirectional motion platform, a pace detector, and a data processor.

The pace detector is configured to detect, and send to the data processor, a pace of an object moving over the omnidirectional motion platform.

The data processor is coupled to both the pace detector and the omnidirectional motion platform and is configured to decompose the pace of the object into speeds along at least two directions.

The omnidirectional motion platform comprises at least two pluralities of movable members and a driving device, wherein the driving device is configured, based on the speeds along the at least two directions, to drive each of the at least two pluralities of movable members to translocate the object along one of the at least two directions and in a direction opposite to a corresponding speed such that the object remains at a substantially same place over the omnidirectional motion apparatus.

In the omnidirectional motion apparatus, the object can be a human, an animal, or a machine, such as a robot, a moving mechanic object, etc.

In the omnidirectional motion apparatus, the speeds along the at least two directions can comprise a first speed along a first direction and a second speed along a second direction, wherein the second direction is nonparallel with the first direction.

Accordingly, the at least two pluralities of movable members can comprise a plurality of first movable members and a plurality of second movable members. The plurality of first movable members are configured to translocate the object along the first direction and in a direction opposite to the first speed, and the plurality of second movable members are configured to translocate the object along the second direction and in a direction opposite to the second speed.

In the omnidirectional motion apparatus, the plurality of first movable members can be further configured to translocate the object along the second direction; and the plurality of second movable members can be further configured to translocate the object along the first direction.

In some embodiments of the omnidirectional motion apparatus, the omnidirectional motion platform further comprises a conveying trough and a motion platform base. The motion platform base is configured to provide a surface for the plurality of first movable members and the plurality of second movable members to move thereover to thereby translocate the object; and the plurality of first movable members and the plurality of second movable members are configured to move back and forth between the conveying trough and the motion platform base.

In some embodiments of the omnidirectional motion apparatus, the driving device comprises a first driving sub-device and a second driving sub-device, wherein the first driving sub-device is configured to drive the plurality of first movable members to move along the first direction over the motion platform base; and the second driving sub-device is configured to drive the second movable members to move along the second direction over the motion platform base.

In some embodiments of the omnidirectional motion apparatus, at least one of each first movable member and each second movable member comprises a spherical body.

In some other embodiments of the omnidirectional motion apparatus, at least one of each first movable member and each second movable member comprises a track, which is configured such that a portion of the track can move over the omnidirectional motion apparatus to thereby translocate the object in contact therewith.

In the embodiments as mentioned above, each first movable member can comprise a first track, and each second movable member can comprise a second track. As such, the driving device can comprise a first rotor, a second rotor and a position actuator, wherein the first rotor is configured to drive each first track such that a portion of the each first track in contact with the object can move along the first direction; the second rotor is configured to drive each second track such that a portion of the each second track in contact with the object can move along the second direction; and the position actuator is configured to adjust positions of each first track and each second track along a third direction perpendicular to the first direction and the second direction to thereby control alternate contact of the each first track or the each second track with the object.

According to some embodiments, the position actuator comprises a driving motor, a first connecting rod, and a second connecting rod, wherein each first track and each second track are respectively mounted over the first connecting rod and the second connecting rod; the first connecting rod and the second connecting rod are each coupled to the driving motor; and the driving motor is configured to drive the first connecting rod and the second connecting rod to move along the third direction to thereby control alternate contact of the each first track or the each second track with the object.

According to some embodiments, the first tracks and the second tracks are arranged in an array. The first tracks and the second tracks can be arranged such that each first track is surrounded by four second tracks, and that each second track is surrounded by four first tracks.

In a third aspect, the present disclosure further provides a motion system, which comprises an omnidirectional motion apparatus according to any one of the embodiments as described above.

In the motion system, the object can be a user, and the motion system can further comprise a display device for the user to wear while moving over the omnidirectional motion apparatus. Herein the display device can comprise one or more virtual reality (VR) or augmented reality (AR) devices.

According to some embodiments, the motion system further comprises a support structure to facilitate balancing of the user.

Through real-time monitoring of a pace of a user through a pace detector and driving in real time the movable members over the omnidirectional motion apparatus based on the pace, the omnidirectional motion apparatus provided by the present disclosure can ensure the body of the user to be located in the middle, or center, of the omnidirectional motion apparatus no matter in any directions and/or in any speed the user moves. Therefore the omnidirectional motion apparatus disclosed herein can satisfy the requirements of virtual reality that a user should be able to move in any directions and/or in different speeds.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way. It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, the present disclosure provides an omnidirectional motion apparatus, such as an omnidirectional treadmill. The omnidirectional motion apparatus can be used, for example, as a fitness treadmill, as a gaming platform, or as a rehabilitation apparatus, etc.

Figure 1:
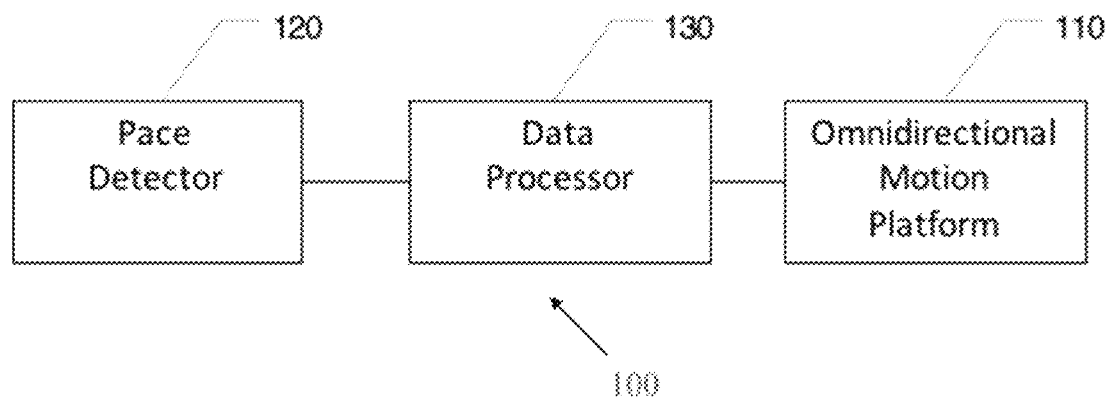
FIG. 1 is a block diagram of an omnidirectional motion apparatus according to a first embodiment of the present disclosure.

FIG. 1 is a block diagram of an omnidirectional motion apparatus 100 according to a first embodiment of the present disclosure. As shown, the omnidirectional motion apparatus 100 comprises an omnidirectional motion platform 110, a pace detector 120, and a data processor 130.

The omnidirectional motion platform 110 comprises a plurality of movable members and a driving device. The plurality of movable members may include a plurality of first movable members and a plurality of second movable members. The plurality of first movable members can move at least in a first direction driven by the driving device; the plurality of second movable members can move at least in a second direction driven by the driving device. The first direction and the second direction can be perpendicular to each other according to some embodiments. For example, the first and second directions can be the orthogonal X and Y directions in the Cartesian geometry. In some other embodiments, the first and second directions can be non-orthogonal directions, and a combination thereof can produce a plurality of different directions.

The pace detector 120 is configured to detect a pace of an object over the omnidirectional motion platform 100. The object can be, for example, a user. The pace of the user can include a speed and a direction of the pace of the user.

The data processor 130 is configured to decompose the pace of the user detected by the pace detector into a first speed along the first direction and a second speed along the second direction.

The driving device is configured, based on the first speed along the first direction, to drive the first movable members to move along the first direction, such that the first movable members have a moving direction opposite to the direction of the first speed along the first direction.

The driving device is further configured, based on the second speed along the second direction, to drive the second movable members to move along the second direction, such that the second movable members have a moving direction opposite to the direction of the second speed along the second direction.

Herein, the first direction and the second direction are configured not to be parallel to each other. For example, the first direction can be perpendicular to the second direction. In some other embodiments, the first and second directions can have an angle therebetween, and the angle is larger than 0 degrees (i.e., nonparallel).

According to the embodiments of the omnidirectional motion apparatus as described above, the pace of a user can be monitored in a real-time mode via the pace detector, and the movable members on the omnidirectional motion apparatus can be driven to move in a real-time mode based on the pace of the user.

As such, the omnidirectional motion platform 110 can effectively "translocate" the user in a predetermined position on the omnidirectional motion platform 110, even though the user perceives him or herself as walking, running, or jumping. For example, it can be ensured that the user is translocated or positioned at the center of the omnidirectional motion platform no matter in which direction or at which speed the user is moving. This together with the VR components such as the HMD of the motion system produce a more realistic virtual reality experience for the user, and the user can perceive moving in any directions at any speeds seamlessly.

Figure 2:
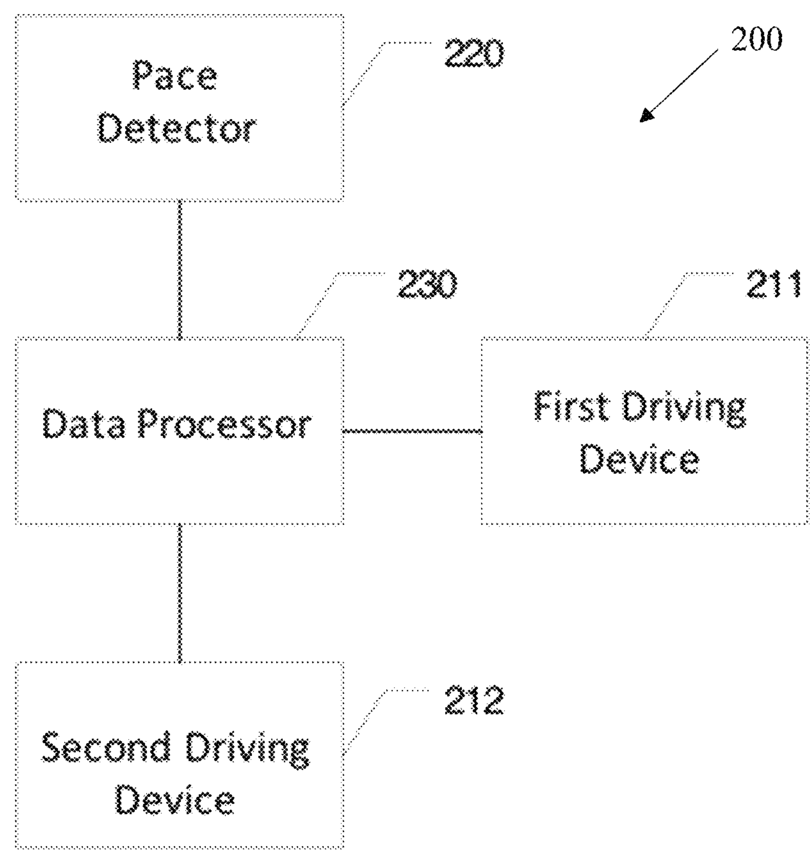
FIG. 2 is a block diagram of an omnidirectional motion apparatus according to a second embodiment of the present disclosure.
Figure 3:
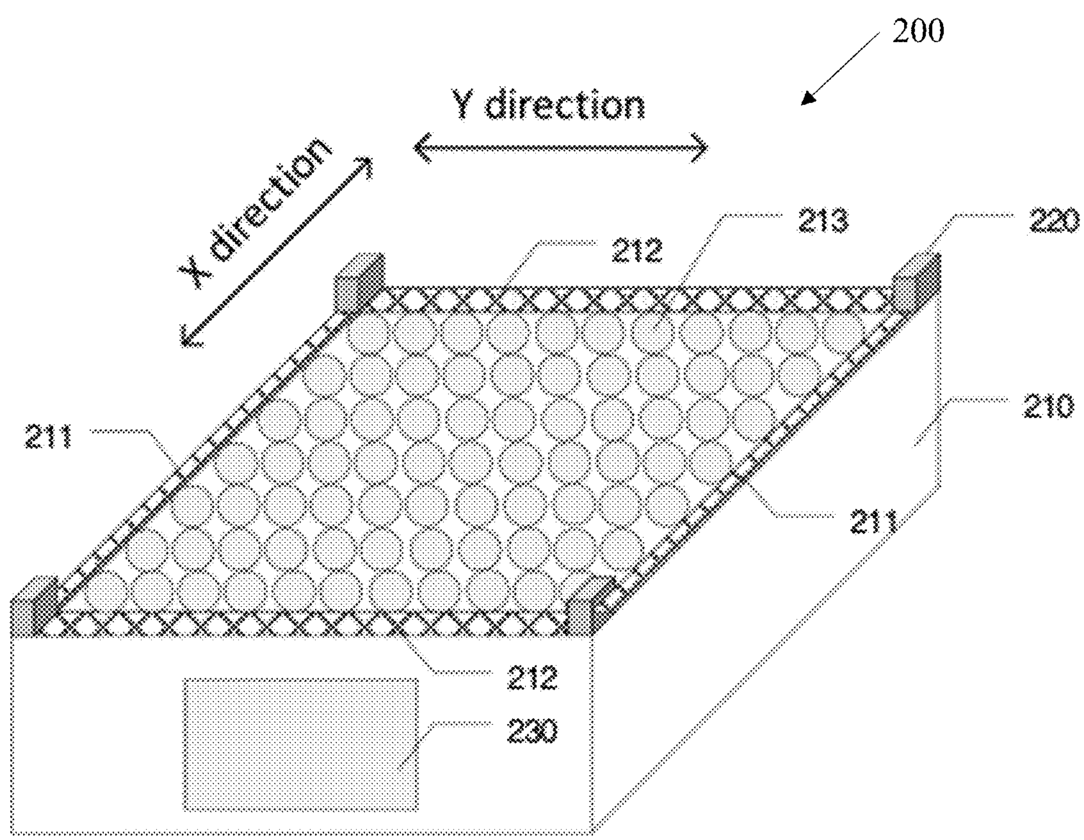
FIG. 3 is a schematic diagram of the omnidirectional motion apparatus according to the second embodiment illustrated in FIG. 2.

FIG. 2 is a block diagram of an omnidirectional motion apparatus 200 according to a second embodiment of the present disclosure. FIG. 3 is a perspective view of the omnidirectional motion apparatus 200 according to the embodiments illustrated in FIG. 2. As shown in FIGS. 2 and 3, the omnidirectional motion apparatus comprises an omnidirectional motion platform 210, a pace detector 220, and a data processor 230.

The omnidirectional motion platform 210 comprises a plurality of movable members and at least one driving device. The plurality of movable members can include a plurality of first movable members and a plurality of second movable members. The at least one driving device includes a first driving device 211 and a second driving device 212.

Driven by the first driving device 211, the first movable members and the second movable members can both move in a first direction (for example, the Y direction, comprising a forward direction and a reverse direction). Driven by the second driving device 212, the first movable members and the second movable members can both move along the second direction (For example, the X direction, comprising forward direction and reverse direction).

The pace detector 220 is configured to detect a pace of the user. The detected pace can include a speed and a direction of the pace of the user.

The data processor 230 is configured to decompose the pace of the user detected by the pace detector 220 into a first speed along the first direction and a second speed along the second direction. Driven by the first driving device 211, the first movable members and the second movable members can move along the first direction based on the first speed along the first direction. Driven by the second driving device 212, the first movable members and the second movable members can move along the second direction based on the second speed along the second direction.

For example, with reference to FIG. 3, the pace detector 220 and the data processor 230 can be configured on the omnidirectional option platform 210. The pace detector 220 can be disposed at the four corners of the omnidirectional platform 210. In some embodiments, the first movable members and the second movable members are all spherical bodies. In some embodiments, the first and second movable members are stainless steel balls having a diameter in the range of 1 mm-100 mm.

In some embodiments, the plurality of movable members 213 over the omnidirectional platform 210 are all small balls of substantially the same volume and size, each of the movable members 213 not only can move along the first direction, but also can move along the second direction.

The first driving device 211 and the second driving device 212 are configured in a surrounding region of the omnidirectional motion platform.

Figure 4:
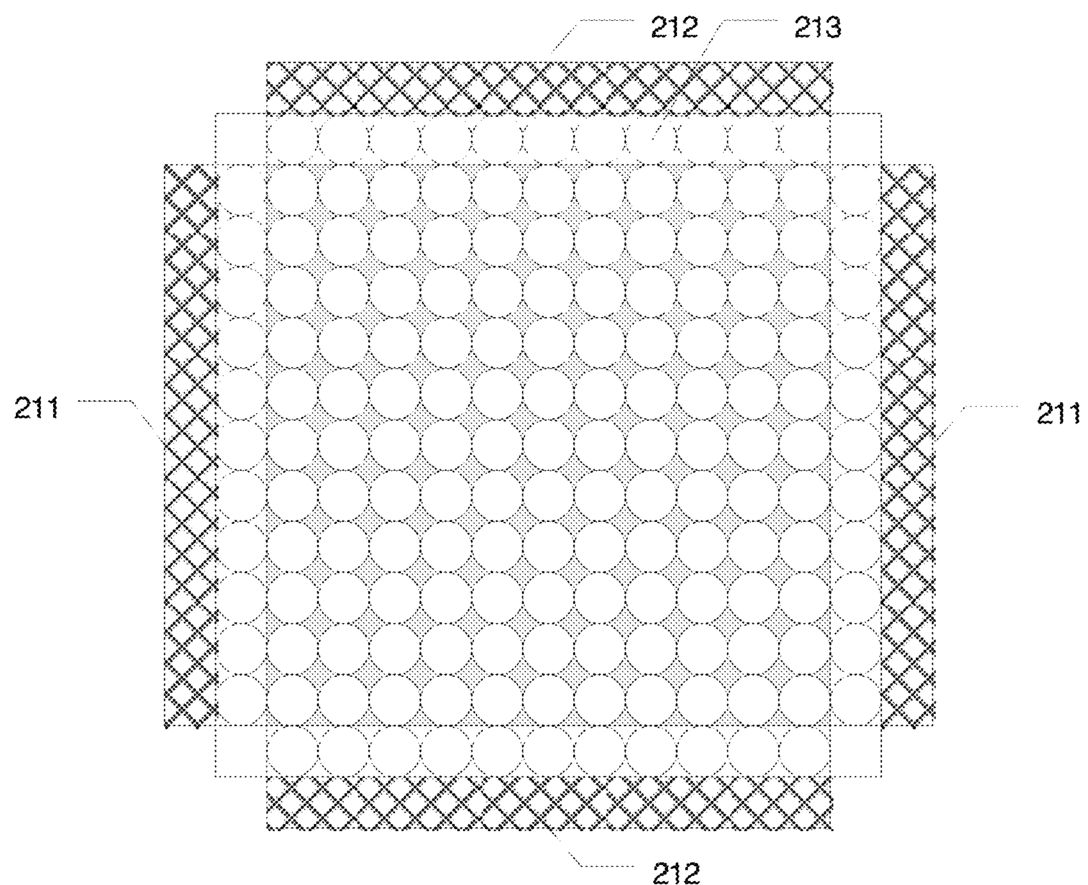
FIG. 4 is a top view of the omnidirectional motion apparatus shown in FIG. 3.
Figure 5A:
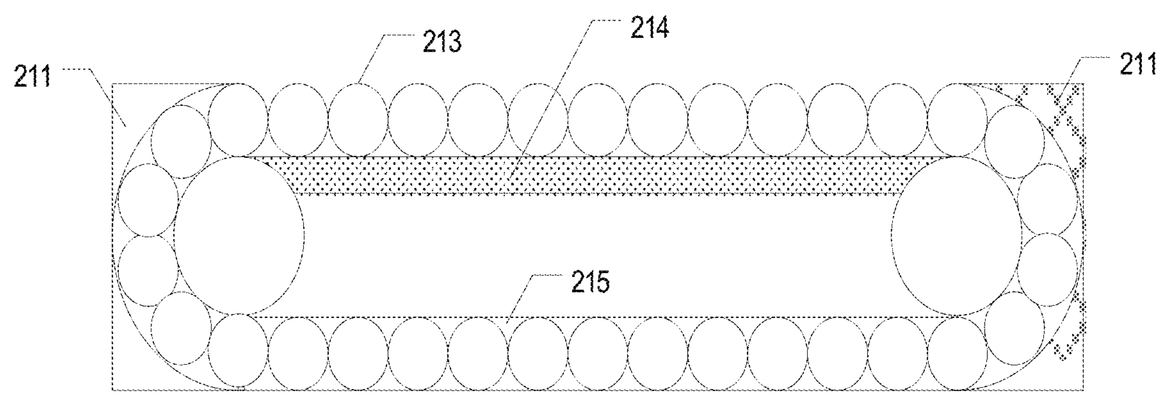
FIG. 5A is a cross-sectional view in a first direction of the omnidirectional motion apparatus shown in FIG. 3.

FIG. 4 is a top view of the omnidirectional motion apparatus according to some embodiments, and FIG. 5A is a cross-sectional view of the omnidirectional motion apparatus along a first direction.

As shown in FIGS. 4 and 5A, the omnidirectional motion apparatus further comprises a conveying trough 215 and a motion platform base 214. Driven by the driving device, each of the movable members 213 can move from the conveying trough 214 to the motion platform base 214, or can also move from the motion platform base 214 to the conveying trough 215.

The motion platform base 214 can be manufactured with a hard material that has a flat and smooth surface and a small friction coefficient. The size and thickness of the motion platform base 214 can be determined depending on a size of the omnidirectional motion apparatus and a weight of the user. For example, the motion platform base 214 can be composed of carbon fiber, plastic, or polycarbonate, etc.

Each of the movable members 213 can be driven by the first driving device 211 to move along the first direction over the motion platform base 214, and each of the movable members 213 can be driven by the second driving device 212 to move along the second direction over the motion platform base 214.

Figure 5B:
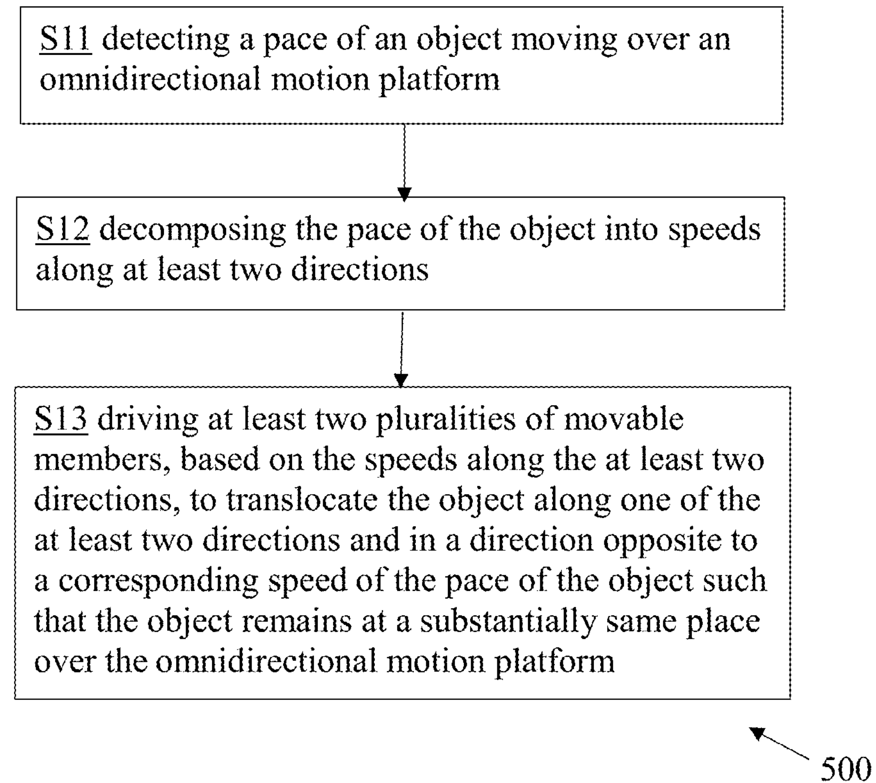
FIG. 5B is a flowchart illustrating a method for controlling the omnidirectional motion apparatus to realize an omnidirectional motion according to some embodiments.

In another aspect, as illustrated in FIG. 5B, a method 500 is provided for controlling the omnidirectional motion apparatus as described above to realize omnidirectional motions.

In some embodiments, the control method can include the following steps.

S11: the pace detector detecting the pace of the user.

S12: the data processor decomposing the pace of the user detected by the pace detector into a first speed along a first direction and a second speed along a second direction; the first driving device 211 driving the movable members 213 to move along the first direction on the motion platform base 214 and in a moving direction opposite to the direction of the first speed along the first direction that has been decomposed from the pace of the user; and the second driving device 212 driving the movable members 213 to move along the second direction on the motion platform base 214 and in a moving direction opposite to the direction of the second speed along the second direction that has been decomposed from the pace of the user.

S13: driving at least two pluralities of movable members, based on the speeds along the at least two directions, to translocate the object along one of the at least two directions and in a direction opposite to a corresponding speed of the pace of the object such that the object remains at a substantially same place over the omnidirectional motion platform.

For example, if a direction of the pace of the user is along an X direction, the second driving device 212 can drive the movable members on the motion platform base 214 to move along the X direction. The movable members have a same equivalent moving speed as the speed of, but have a moving direction opposite to the direction of, the pace of the user.

If the user moves along a Y direction, the first driving device 211 can drive the movable members on the motion platform base 214 to move along the Y direction. The movable members have a same equivalent moving speed as the speed of, but have a moving direction opposite to the direction of, the pace of the user.

If a moving speed of the pace of the user is V, and a moving direction of the pace of the user has an angle of $\alpha$ with the Y direction, where $0 \leq \alpha \leq 90°$, the moving direction of the pace of the user has an angle of $(90-\alpha)$ with the X direction in the case that X and Y are orthogonal. The first driving device 211 and the second driving device 212 can drive the movable members on the motion platform base 214 in a fast and alternate manner to thereby move in a direction opposite to the moving direction of the pace of the user.

Specifically, the movable members can be controlled to have a moving speed of $2V^*\sin\alpha$ and $2V^*\cos\alpha$ in the X direction and in the Y direction, respectively. As such, the movable members can have a same equivalent moving speed as the speed of, but have a moving direction opposite to the direction of, the pace of the user.

Figure 6:
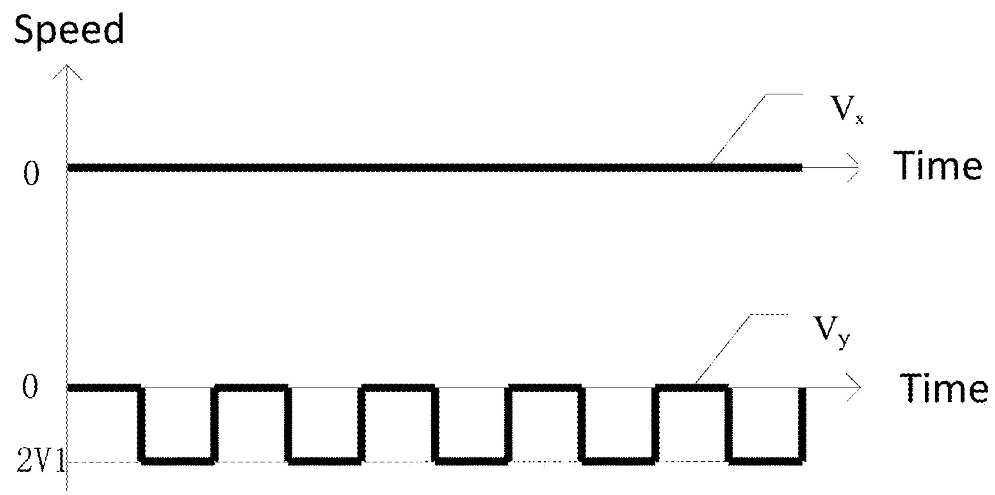
FIG. 6 illustrates a first mode of the moving speed of the movable members in an X direction and a Y direction over the omnidirectional motion apparatus according to some embodiments of the present disclosure.

For example, if the user is moving in a straight-forward direction and at a speed of V1, and assuming that the straight-forward direction and the straight-right direction are respectively the positive directions of the Y direction and the X direction, then the movable members on the motion platform base 214 have a moving speed of $V_x$ in the X direction, as shown in FIG. 6, and a moving speed of $V_y$ in the Y direction, as shown in FIG. 6.

Figure 7:
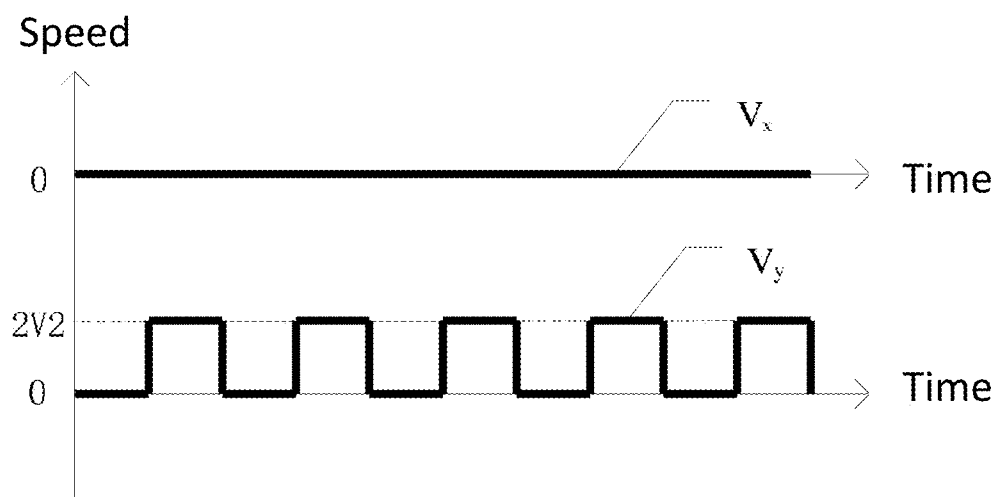
FIG. 7 illustrates a second mode of the moving speed of the movable members.

If the user is moving in a straight-rearward direction and at a speed of V2, and assuming that the straight-forward direction and the straight-right direction are respectively the positive directions of the Y direction and the X direction, then the movable members on the motion platform base 214 have a moving speed of $V_x$ in the X direction, as shown in FIG. 7, and a moving speed of $V_y$ in the Y direction, as shown in FIG. 7.

Figure 8:
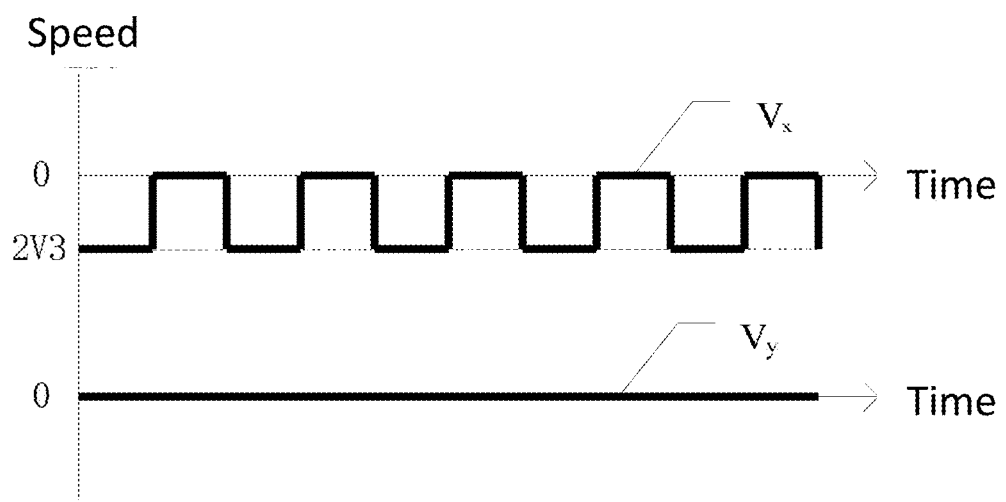
FIG. 8 illustrates a third mode of the moving speed of the movable members.

If the user is moving in a straight-right direction and at a speed of V3, and assuming that the straight-forward direction and the straight-right direction are respectively the positive directions of the Y direction and the X direction, then the movable members on the motion platform base 214 have a moving speed of $V_x$ in the X direction, as shown in FIG. 8, and a moving speed of $V_y$ in the Y direction, as shown in FIG. 8.

Figure 9:
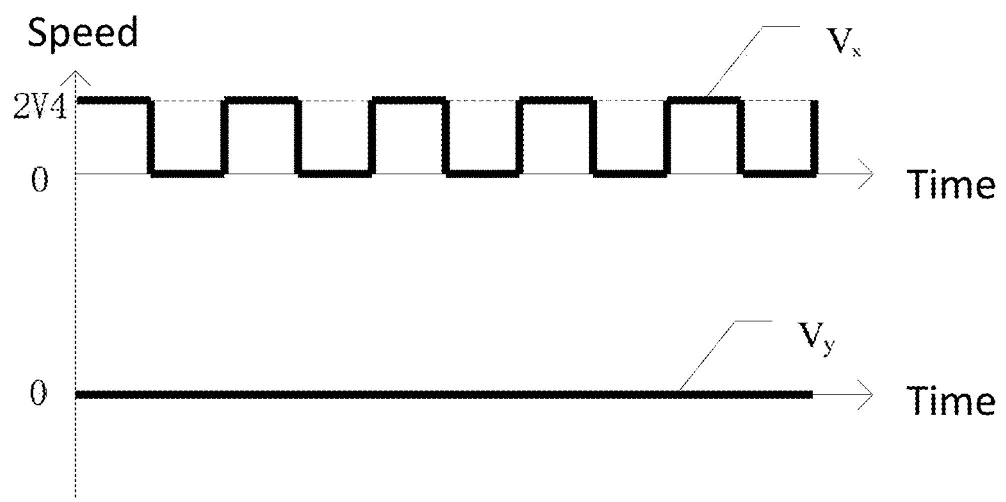
FIG. 9 illustrates a fourth mode of the moving speed of the movable members.

If the user is moving in a straight-left direction and at a speed of V4, and assuming that the straight-forward direction and the straight-right direction are respectively the positive directions of the Y direction and the X direction, then the movable members on the motion platform base 214 have a moving speed of $V_x$ in the X direction, as shown in FIG. 9, and a moving speed of $V_y$ in the Y direction, as shown in FIG. 9.

Figure 10:
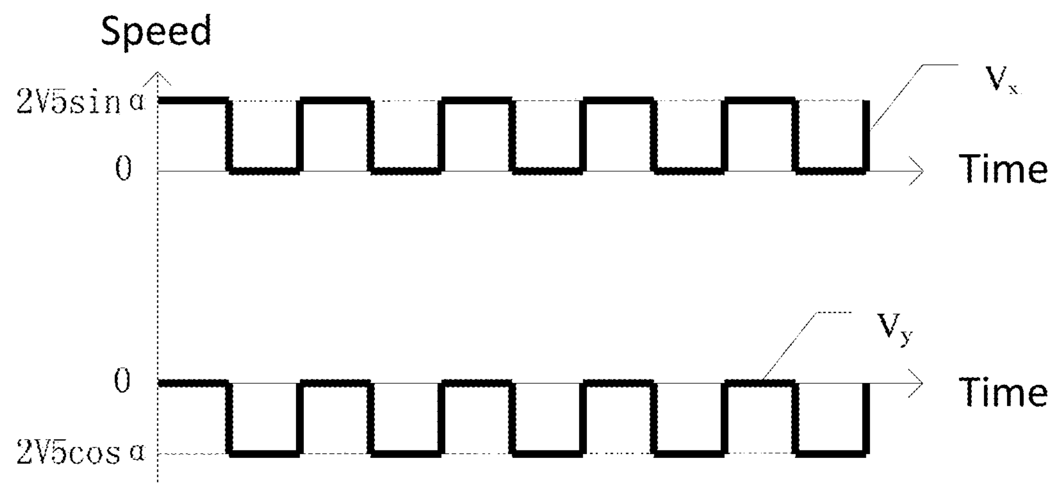
FIG. 10 illustrates a fifth mode of the moving speed of the movable members.

If the user is moving in a left-forward direction having an angle of a with the straight-forward direction, and at a speed of V5, and assuming that the straight-forward direction and the straight-right direction are respectively the positive directions of the Y direction and the X direction, then the movable members on the motion platform base 214 have a moving speed of $V_x$ in the X direction, as shown in FIG. 10, and a moving speed of $V_y$ in the Y direction, as shown in FIG. 10.

Figure 11:
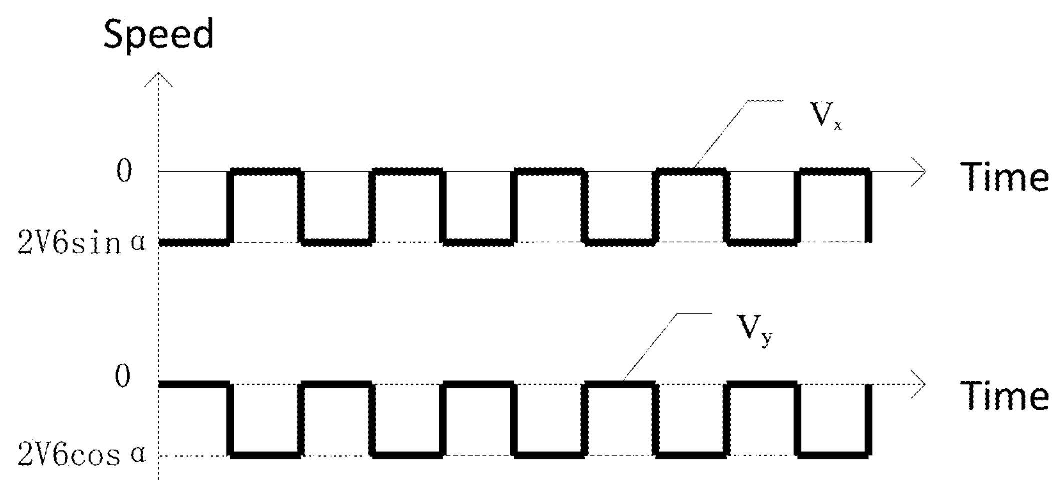
FIG. 11 illustrates a sixth mode of the moving speed of the movable members.

If the user is moving in a right-forward direction having an angle of a with the straight-forward direction ($0 \leq \alpha \leq 90°$), and at a speed of V6, and assuming that the straight-forward direction and the straight-right direction are respectively the positive directions of the Y direction and the X direction, then the movable members on the motion platform base 214 have a moving speed of $V_x$ in the X direction, as shown in FIG. 11, and a moving speed of $V_y$ in the Y direction, as shown in FIG. 11.

Figure 12:
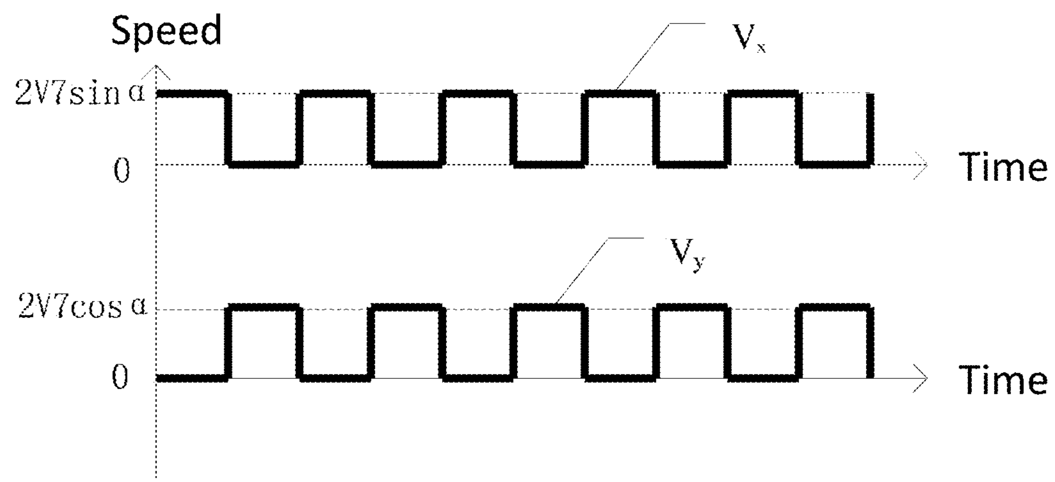
FIG. 12 illustrates a seventh mode of the moving speed of the movable members.

If the user is moving in a left-rearward direction having an angle of a with the straight-rearward direction ($0 \leq \alpha \leq 90°$), and at a speed of V7, and assuming that the straight-forward direction and the straight-right direction are respectively the positive directions of the Y direction and the X direction, then the movable members on the motion platform base 214 have a moving speed of $V_x$ in the X direction, as shown in FIG. 12, and a moving speed of $V_y$ in the Y direction, as shown in FIG. 12.

Figure 13:
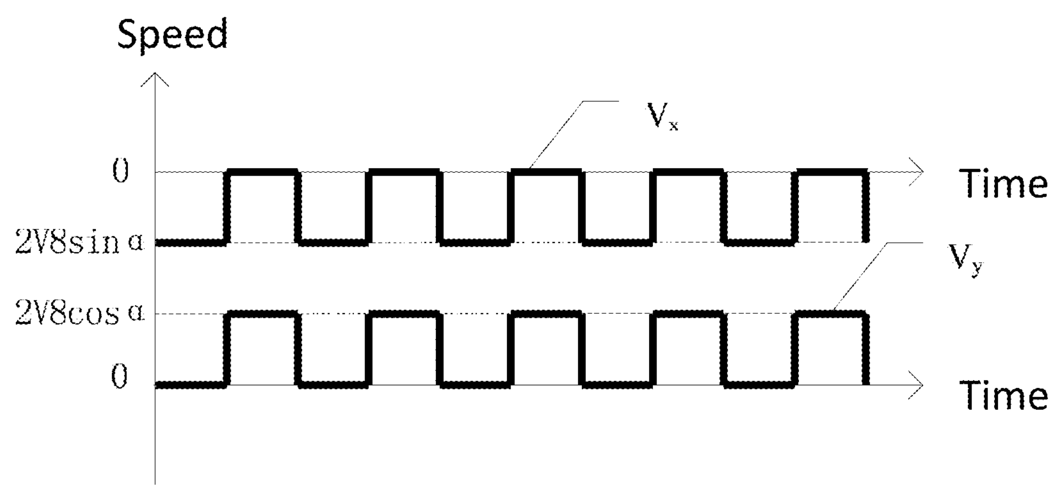
FIG. 13 illustrates an eighth mode of the moving speed of the movable members.

If the user is moving in a right-rearward direction having an angle of a with the straight-rearward direction, and at a speed of V8, and assuming that the straight-forward direction and the straight-right direction are respectively the positive directions of the Y direction and the X direction, then the movable members on the motion platform base 214 have a moving speed of $V_x$ in the X direction, as shown in FIG. 13, and a moving speed of $V_y$ in the Y direction, as shown in FIG. 13.

When a user is using the omnidirectional motion apparatus as described above, the pace of the user is detected in a real-time mode by the pace detector 220 to thereby obtain the moving direction and the moving speed of the pace of the user. Upon receiving the moving direction and the moving speed of the pace of the user detected by the pace detector 220, the data processor 230 can decompose the moving direction and the moving speed of the pace of the user into a first speed along a first direction and a second speed along a second direction, where the first direction and the second direction can be perpendicular to each other.

Subsequently, based on the first speed along the first direction and the second speed along the second direction, the movable members can be controlled alternately to move along the first direction and along the second direction. As such, no matter in which direction or at which speed the user is moving, it can be ensured that the user is positioned in the center of the omnidirectional motion platform.

Figure 14:
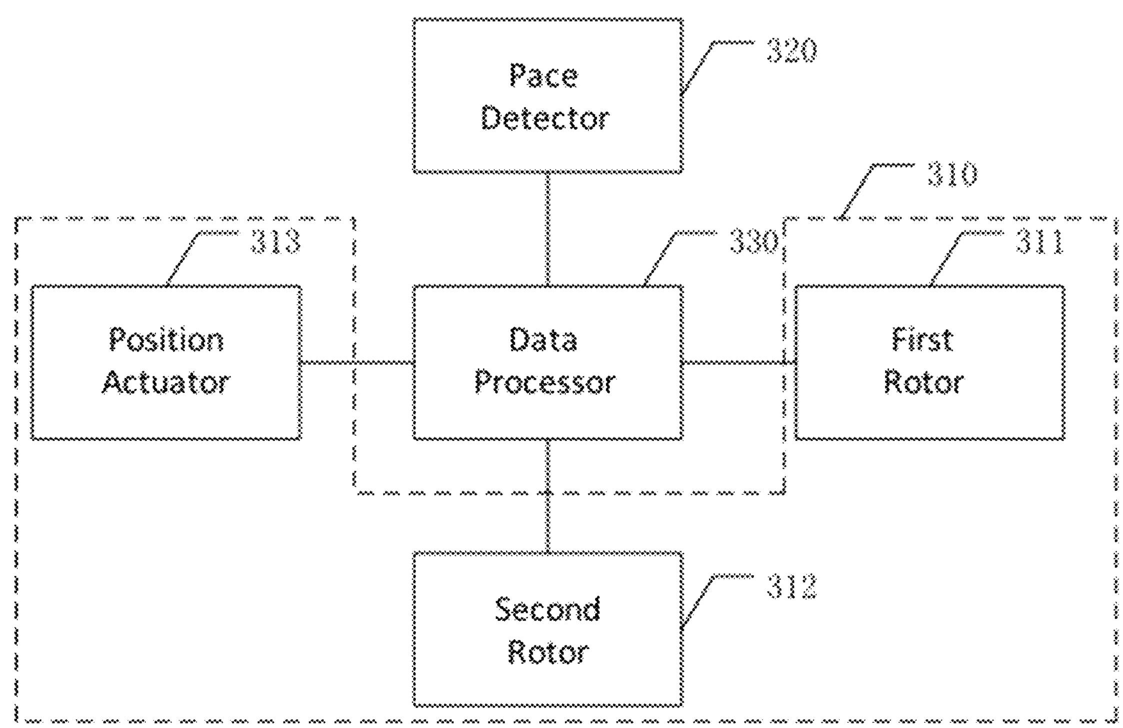
FIG. 14 is a block diagram of an omnidirectional motion apparatus according to a third embodiment of the present disclosure.

FIG. 14 is a block diagram of an omnidirectional motion apparatus according to a third embodiment of the present disclosure. As shown in FIG. 14, the omnidirectional motion apparatus comprises an omnidirectional motion platform 310, a pace detector 320, and a data processor 330.

The omnidirectional motion platform 310 comprises a plurality of movable members and a driving device. The plurality of movable members include a plurality of first movable members and a plurality of second movable members. The driving device includes a first rotor 311, a second rotor 312, and a position actuator 313.

The pace detector 320 is configured to detect a pace of a user, including a moving speed and a moving direction of the pace of the user.

The data processor 330 is configured to decompose the pace of the user detected by the pace detector 320 into a first speed along a first direction and a second speed along a second direction. The first rotor 311 drives the first movable members to move along the first direction based on the first speed along the first direction. The second rotor 312 drives the second movable members to move along the second direction based on the second speed along the second direction.

The "processor" can include any suitable hardware and/or software system, mechanism or component that processes data, signals or other information. The processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. Various embodiments disclosed herein can be realized via hardware and/or software, such a computer program stored on a memory. For example, a tangible, non-transitory, computer-readable storage medium having instructions stored there on that, when executed by one or more processors, cause the one or more processors to perform operations including the steps described above.

In the embodiments of the omnidirectional motion apparatus as described above, a pace of a user can be monitored in a real-time mode via the pace detector, and the movable members on the omnidirectional motion platform can be driven to move in a real-time mode based on the pace of the user. As such, it can be ensured that the is positioned at the center of the omnidirectional motion apparatus no matter in which direction or at which speed the user is moving. While wearing a VR device such as an HMD, the user can walk or run in any direction or at any speed while viewing the scenes consistent with the user's body motion.

Figure 15:
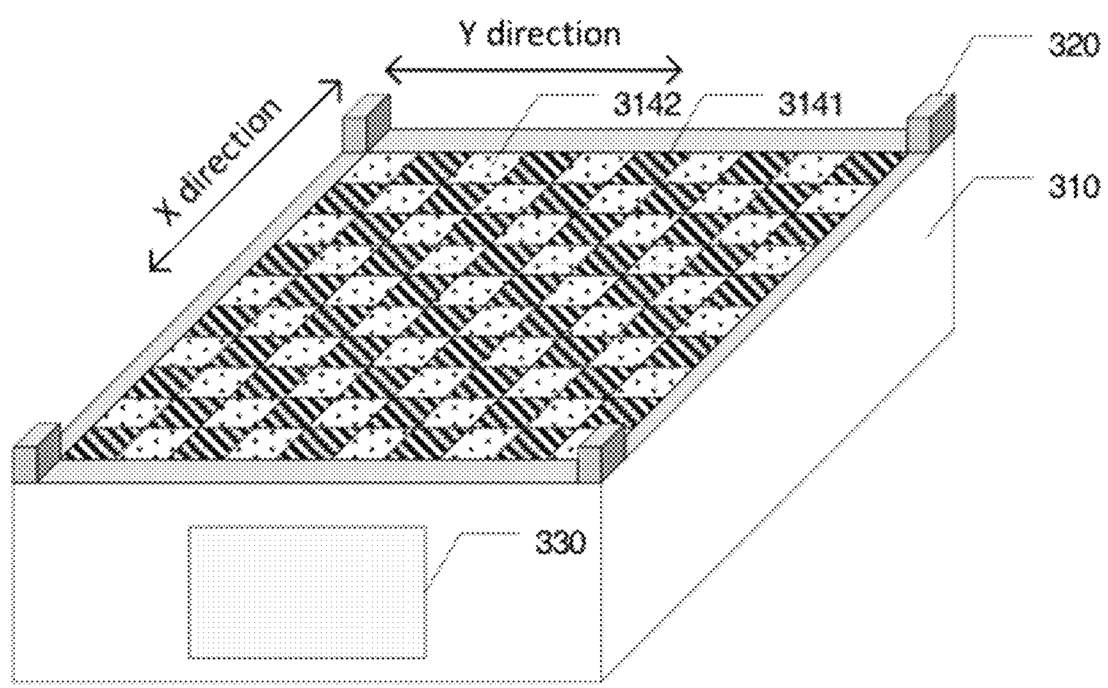
FIG. 15 is a perspective view of an omnidirectional motion apparatus according to the third embodiment of the present disclosure.

In some embodiments as illustrated in FIG. 15, the pace detector 320 and the data processor 330 can be configured over the omnidirectional motion platform 310. For example, the pace detector 320 can be mounted at the four corners of the omnidirectional motion platform 310. The omnidirectional motion platform 310 include a plurality of movable members and a driving device. The plurality of movable members include a plurality of first movable members 3141 and a plurality of second movable members 3142. Each first movable member 3141 comprises a first track, and each second movable member 3142 comprises a second track.

The driving device comprises a first rotor 311, a second rotor 312, and a position actuator 313. The rotation axial direction of the first rotor 311 is the second direction (e.g., X direction), and the rotation axial direction of the second rotor 312 is the first direction (e.g., Y direction).

According to some embodiments, the data processor 330 is configured to decompose the pace of the user detected by the pace detector 320 into a first speed along the first direction and a second speed along the second direction. The first rotor 311 drives a portion of the first track that is in contact with a body portion (such as the feet) of the user to move along the first direction based on the first speed along the first direction. The second rotor 312 drives a portion of the second track that is in contact with the body of the user to move along the second direction based on the second speed along the second direction.

Figure 16:
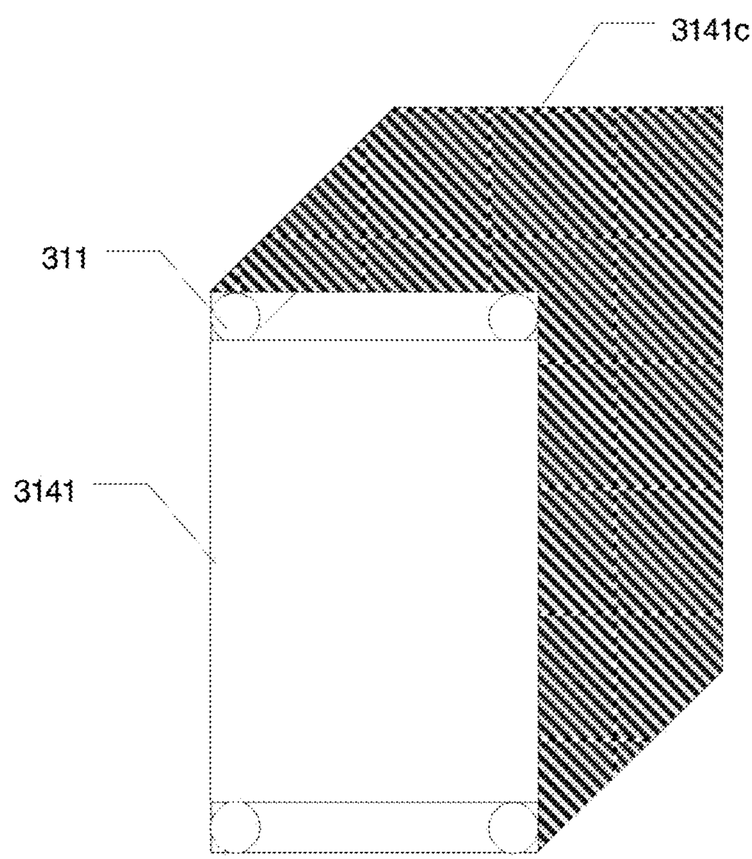
FIG. 16 is a schematic diagram of a movable member according to some embodiments of the present disclosure.

As shown in FIG. 16, the first rotor 311 is configured to drive the first track 3141*c* such that the first track 3141*c* has a same rotation direction as the first rotor 311, thereby the portion of the first track that is in contact with the body of the user can move along the first direction.

The second rotor 312 is configured to drive the second track so that the second track has a same rotation direction as the second rotor 312, thereby the portion of the second track that is in contact with the body of the user can move along the second direction.

The position actuator 313 is configured to control the positions of the first movable members 3141 and of the second movable members 3142 in a third direction (for example, a vertical, or Z direction), to thereby control whether the first movable members and the second movable members can be in contact with the body part of the user. According to some embodiments, the third direction is perpendicular to both the first direction and the second direction.

Figure 17:
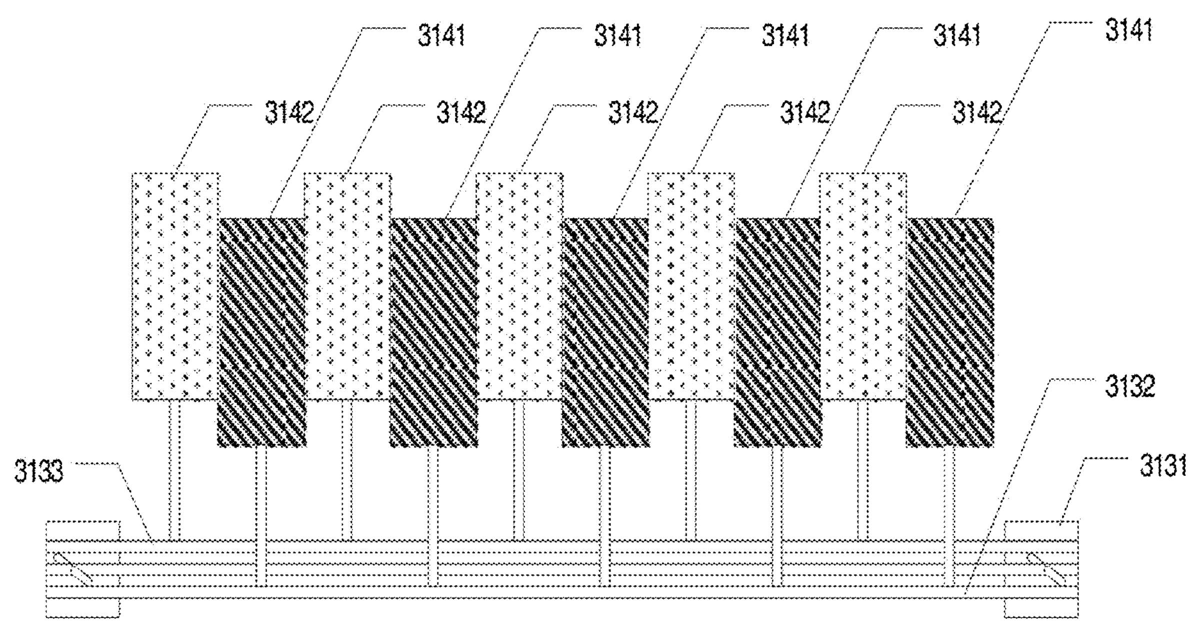
FIG. 17 is a schematic diagram of the position actuator according to some embodiments of the present disclosure.

For example, with reference to FIG. 17, the position actuator 313 comprises a driving motor 3131, a first connecting rod 3132, and a second connecting rod 3133, wherein the first connecting rod 3132 and the second connecting rod 3133 are both connected to the driving motor 3131.

The first movable members 3141 are disposed over the first connecting rod 3132. The second movable members 3142 are disposed over the second connecting rod 3133. The driving motor 3131 is configured to control the positions of the first movable members 3141 in the third direction by driving the first connecting rod 3132 to move in the third direction, and is further configured to control the positions of the second movable members 3142 in the third direction by driving the second connecting rod 3133 to move in the third direction.

As shown in FIG. 15, the plurality of movable members on the omnidirectional motion platform 310 can be arranged in an array, where the first movable members 3141 and the second movable members 3142 are alternately arranged over the omnidirectional motion platform 310.

For example, a total of N*N movable members can be arranged in an array on the omnidirectional motion platform. The four movable members that are neighboring to each first movable member 3141 along the first direction and along the second direction are all second movable member 3142. The four movable members that are neighboring to each second movable member 3142 along the first direction and along the second direction are all first movable member 3141.

In another aspect, a method for controlling the omnidirectional platform as described above to thereby achieve an omnidirectional motion is further provided.

The method can comprise the following steps according to some embodiments.

S21: the pace detector detecting the pace of the user.

S22: the data processor decomposing the pace of the user detected by the pace detector into a first speed along a first direction and a second speed along a second direction; the first rotor 311 driving the portion of the first track that is in contact with the body of the user to move along the first direction and in a moving direction opposite to the direction of the first speed along the first direction that has been decomposed from the pace of the user; and the second rotor 312 driving the portion of the second track that is in contact with the body of the user to move along the second direction and in a moving direction opposite to the direction of the second speed along the second direction that has been decomposed from the pace of the user.

Figure 18:
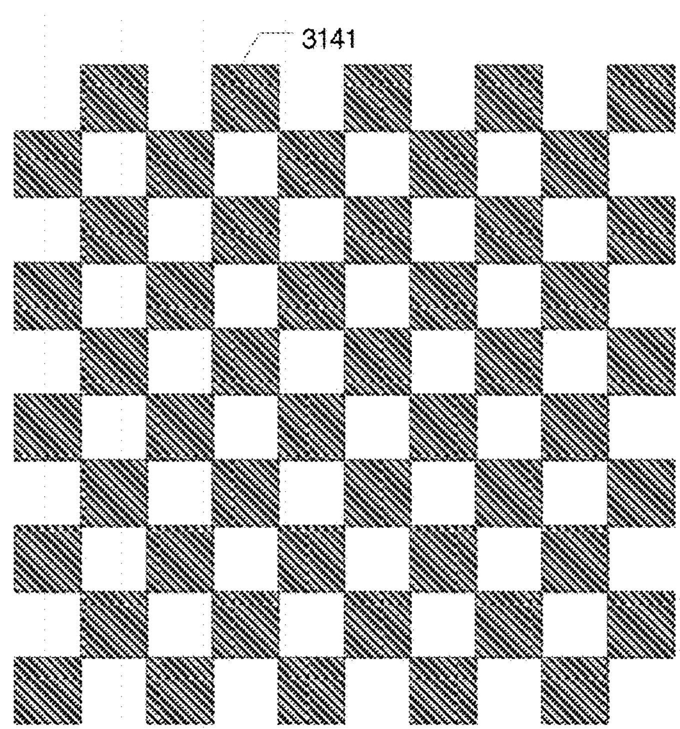
FIG. 18 is a schematic diagram of the first movable member functioning over the omnidirectional motion apparatus in FIG. 15.

For example, if a direction of the pace of the user is along a Y direction (i.e., a first direction), the position actuator 313 controls the positions of the first movable members 3141 and the second movable members 3142 along the third direction, as shown in FIG. 18, so as to cause the first track to be in contact with the body part (such as the feet) or the footwear of the user and the second track not to be in contact with the user. At the same time, the first rotor 311 is controlled to drive the portion of the first track that is in contact with the body of the user to move along the Y direction, having a same equivalent moving speed as the speed of, but having moving directions opposite to, the pace of the user. At this time, the second rotor 312 does not need to move.

Figure 19:
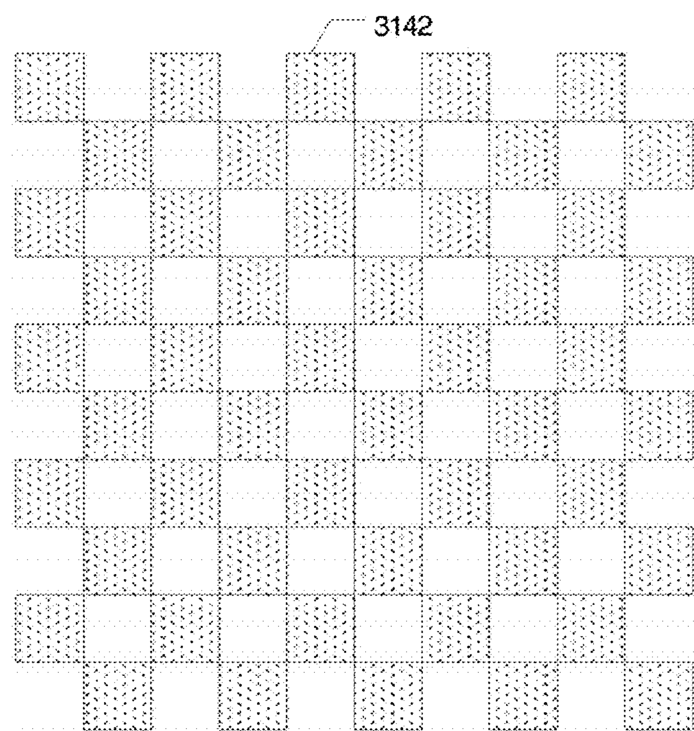
FIG. 19 is a schematic diagram of the second movable member functioning over the omnidirectional motion apparatus in FIG. 15.

If the user is moving in an X direction (i.e., a second direction), the position actuator 313 controls the positions of the first movable members 3141 and the second movable members 3142 along the third direction, as shown in FIG. 19, so as to cause the second track to be in contact with the user and the first track not to be in contact with the user. At the same time, the second rotor 312 is controlled to drive the portion of the second track that is in contact with the user to move along the X direction, having a same equivalent moving speed as the speed of, but having moving directions opposite to, the pace of the user. At this time, the first rotor 311 does not need to move.

If a moving speed of the pace of the user is V, and a moving direction of the pace of the user has an angle of $\alpha$ with the Y direction, where $0 \leq \alpha \leq 90°$, the moving direction of the pace of the user has an angle of $(90-\alpha)$ with the X direction, and the first rotor 311 and the second rotor 312 are both moving.

The first rotor 311 drives the portion of the first track that is in contact with the user to move in a moving speed of $2V^*\cos\alpha$ (i.e., the rotation speed of the first track). The second rotor 312 drives the portion of the second track that is in contact with the user to move in a moving speed of 2V*sin α (i.e., the rotation speed of the second track).

Meanwhile, by means of the position actuator, the first track and the second track are alternately controlled to be in contact with the user to ensure that the movable members on the omnidirectional motion platform have a same equivalent moving speed as the speed of, but having moving directions opposite to, the pace of the user.

In addition, in order to reduce power consumption of the omnidirectional motion apparatus, when the first track is in contact with the user, the second rotor does not need to move (i.e., the second track is not rotating), and when the second track is in contact with the body of the user, the first rotor does not need to move (i.e., the first track is not rotating).

For example, if the user is moving in a straight-forward direction and at a speed of V1, and assuming that the straight-forward direction and the straight-right direction are respectively the positive directions of the Y direction and the X direction, then the second track has a rotation speed of $V_x$, as shown in FIG. 6, and the first track has a rotation speed of $V_y$, as shown in FIG. 6.

If the user is moving in a straight-rearward direction and at a speed of V2, and assuming that the straight-forward direction and the straight-right direction are respectively the positive directions of the Y direction and the X direction, then the second track has a rotation speed of $V_x$, as shown in FIG. 7, and the first track has a rotation speed of $V_y$, as shown in FIG. 7.

If the user is moving in a straight-right direction and at a speed of V3, and assuming that the straight-forward direction and the straight-right direction are respectively the positive directions of the Y direction and the X direction, then the second track has a rotation speed of $V_x$, as shown in FIG. 8, and the first track has a rotation speed of $V_y$, as shown in FIG. 8.

If the user is moving in a straight-left direction and at a speed of V4, and assuming that the straight-forward direction and the straight-right direction are respectively the positive directions of the Y direction and the X direction, then the second track has a rotation speed of $V_x$, as shown in FIG. 9, and the first track has a rotation speed of $V_y$, as shown in FIG. 9.

If the user is moving in a left-front direction having an angle of α (0≤α≤90°) with the straight-forward direction, and at a speed of V5, and assuming that the straight-forward direction and the straight-right direction are respectively the positive directions of the Y direction and the X direction, then the second track has a rotation speed of $V_x$, as shown in FIG. 10, and the first track has a rotation speed of $V_y$, as shown in FIG. 10.

If the user is moving in a right-front direction having an angle of a with the straight-forward direction, and at a speed of V6, and assuming that the straight-forward direction and the straight-right direction are respectively the positive directions of the Y direction and the X direction, then the second track has a rotation speed of $V_x$, as shown in FIG. 11, and the first track has a rotation speed of $V_y$, as shown in FIG. 11.

If the user is moving in a left-rearward direction having an angle of α (0≤α≤90°) with the straight-rearward direction, and at a speed of V7, and assuming that the straight-forward direction and the straight-right direction are respectively the positive directions of the Y direction and the X direction, then the second track has a rotation speed of $V_x$, as shown in FIG. 12, and the first track has a rotation speed of $V_y$, as shown in FIG. 12.

If the user is moving in a right-rear direction having an angle of a with the straight-rearward direction, and at a speed of V8, and assuming that the straight-forward direction and the straight-right direction are respectively the positive directions of the Y direction and the X direction, then the second track has a rotation speed of $V_x$, as shown in FIG. 13, and the first track has a rotation speed of $V_y$, as shown in FIG. 13.

When a user is using the omnidirectional motion apparatus as described above, the pace of the user is detected in a real-time mode by the pace detector 220 to thereby obtain the moving direction and the moving speed of the pace of the user. Upon receiving the moving direction and the moving speed of the pace of the user detected by the pace detector 220, the data processor 230 can decompose the moving direction and the moving speed of the pace of the user into a first speed along a first direction and a second speed along a second direction, where the first direction and the second direction are perpendicular to each other.

Subsequently, the rotation speed of the first track and the rotation speed of the second track are controlled respectively based on the first speed along the first direction and the second speed along the second direction. At the same time, the first movable members and the second movable members are alternately controlled to move up and/or down along the third direction, causing the first track and the second track to work alternately. As such, no matter in which direction and at which speed the user is moving, it can be ensured that the user is positioned in the center of the omnidirectional platform.

In another aspect, the present disclosure further provides an omnidirectional motion system. The system comprises one or more omnidirectional motion apparatuses according to any one of the embodiments as described above. The system can further comprise one or more VR or AR devices for one or more users to wear. The system can also include a support structure such as the balance cuff to help the user balance. A rigid plat form and a support frame can also be included in the motion system.

In some embodiments, a complete motion system can be provided to one or more users. A plurality of users can interact with each other through a network, such as the Internet. Correspondingly, the processor 230 can be provided with the networking functions. The plurality of users can each walk, run, or jump on their own omnidirectional motion apparatuses provided herein, while interacting with each other in the VR scenes, such as in a social network game, a sport game, or a battle field game.

In some other embodiments, individual modules or components can be provided to the user. For example, the user can obtain the omnidirectional motion platform 210, and then plug-and-play or integrate the omnidirectional motion platform 210 with his or her own processor, VR goggles or conventional flat-screen displays, and/or a support structure, thereby building his or her own complete omnidirectional motion system.

In yet another aspect, the present disclosure further provides a method for controlling an omnidirectional platform according to any one of the embodiments as described above, to thereby realize an omnidirectional motion.

The method can include the following steps according to some embodiments.

In a first step, the pace detector detects the pace of the user. The pace detector can include one or more sensors. The sensors can include, for example, an optical sensor such as a camera, or an ultrasound sensor. These sensors can be disposed adjacent to the omnidirectional motion platform to detect the pace of the user through imaging technologies. In some other embodiments, the sensors can include weight or tension sensors disposed adjacent to the movable members. These sensors can measure the force from the user thereby deriving the pace of the user.

The data processing module can decompose the pace of the user detected by the pace detector into a first speed along a first direction and a second speed along a second direction, and through the driving device, driving the first movable members to move along the first direction and in a moving direction opposite to the direction of the first speed along the first direction, and driving the second movable members to move along the second direction and in a moving direction opposite to the direction of the second speed along the second direction, wherein the first direction and the second direction are not parallel to each other.

In some embodiments, through the driving device, the driving the first movable members to move along the first direction and in a moving direction opposite to the direction of the first speed along the first direction, and driving the second movable members to move along the second direction and in a moving direction opposite to the direction of the second speed along the second direction can be realized using the following steps.

For example, a step a) and a step b) can be alternatingly executed.

Step a): through the driving device, driving the first movable members to move along the first direction and in a moving direction opposite to the direction of the first speed along the first direction;

Step b): through the driving device, driving the second movable members to move along the second direction and in a moving direction opposite to the direction of the second speed along the second direction.

In the embodiment of the omnidirectional platform as shown in FIG. 3, the first movable members and the second movable members each can have a spherical shape. For example, a movable member can be a substantially solid ball, or a spherical shell.

In step a), the data processor further drives the second movable members through the driving device based on the second speed along the first direction.

In step b), the data processor further drives the first movable members through the driving device based on the second speed along the second direction.

Preferably, the first direction and the second direction are perpendicular to each other.

As such, in step a), driven by the driving device, the first movable members and the second movable members over the motion platform base of the omnidirectional motion apparatus have a moving speed of $2V*\cos\alpha$ and a moving direction opposite to the direction of the first speed along the first direction, wherein: V is the speed of the pace of the user detected by the pace detector, $\alpha$ is the angle between the direction of the pace of the user detected by the pace detector and the first direction, and $0\leq\alpha\leq 90°$.

In step b), driven by the driving device, the first movable members and the second movable members over the motion platform base of the omnidirectional motion apparatus have a moving speed of $2V*\sin\alpha$ and a moving direction opposite to the direction of the second speed along the second direction.

In some embodiments, the time period for executing step a) and the executing step b) are the substantially same.

In the embodiment of the omnidirectional motion apparatus as shown in FIG. 15, the first movable members comprise a first track, and the second movable members comprise a second track.

In step a), driven by the first rotor of the driving device, the first track rotates in a same rotation direction as the first rotor, wherein the rotation axial direction of the first rotor is the second direction;

In step b), driven by the second rotor of the driving device, the second track rotates in a same rotation direction as the second rotor, wherein the rotation axial direction of the second rotor is the first direction.

The method further comprises: when executing step a), the position actuator of the driving device controlling the positions of the first movable members and the second movable members along the third direction to thereby cause the first track to be in contact with the user and the second track not to be in contact with the user, wherein the third direction is perpendicular to both the first direction and the second direction.

When executing the step b), the position actuator of the driving device controls the positions of the first movable members and the second movable members in the third direction to cause the second track to be in contact with the user and the first track not to be in contact with the user.

In some embodiments, the motions and/or heights of the first and second movable members can be controlled by the position actuator in the third direction (e.g., vertical direction) to emulate a rolling motion or a wavily motion, to give the user perception of walking or running on different types of ground.

In some embodiments, the first and second movable members can be controlled to have varying frictions, for example based on a closed-loop feedback from the detected pace of the user or the weight and/or tension of the user.

In a preferred embodiment, the first direction and the second direction are perpendicular to each other.

As such, in step a), driven by the first rotor, the first track is rotating at a rotation speed of $2V*\cos\alpha$, and the moving direction of the portion of the first track that is in contact with the body of the user is opposite to the direction of the first speed along the first direction, where: V is the speed of the pace of the user detected by the pace detector, a is the angle between the direction of the pace of the user detected by the pace detector and the first direction, wherein, $0\leq\alpha\leq 90°$;

In step b), driven by the second rotor, the second track is rotating at a rotation speed of $2V*\sin\alpha$, and the moving direction of the portion of the second track that is in contact with the body of the user is opposite to the direction of the second speed along the second direction;

Each time when the step a) and step b) are executed, the time period for executing the step a) and the time for executing step b) are substantially same.

Those of ordinary skill in the art will recognize that the functional blocks, methods, units, devices, and systems described in the present disclosure may be integrated or divided into different combinations of systems, units, devices, and functional blocks. Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this disclosure may be performed at the same time.

In some embodiments, a software or program code is provided to realize the method described above. The software or program code can be stored on any type of computer-readable medium or memory, such as a storage device including a disk or hard drive. The computer-readable medium may include a non-transitory computer-readable medium or memory, such as computer-readable media that store data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The software instructions can be stored in the computer readable media, and also be contained in, and provided as, an electronic signal, for example in the form of software as a service (SaaS) delivered from a server (e.g., a distributed system and/or a cloud computing system).

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of realizing an omnidirectional motion, the method comprising:

detecting a pace of an object moving over an omnidirectional motion platform;

decomposing the pace of the object into speeds along at least two directions; and driving at least two pluralities of movable members to translocate the object along one of the at least two directions and in a direction opposite to a corresponding speed of the pace of the object based on the speeds along the at least two directions such that the object remains at a substantially same place over the omnidirectional motion platform, wherein the speeds along the at least two directions comprise:

a first speed along a first direction and a second speed along a second direction, wherein the second direction is not parallel with the first direction;

the at least two movable members comprise:

a plurality of first movable members configured to translocate the object along the first direction and in a direction opposite to the first speed; and a plurality of second movable members configured to translocate the object along the second direction and in a direction opposite to the second speed, wherein each first movable member comprises a first tract and each second movable member comprises a second track, and a portion of the track is configured to move over the omnidirectional motion platform to thereby translocate the object in contact therewith, the driving at least two pluralities of movable members further comprising alternately performing:

driving the plurality of first movable members to translocate the object along the first direction and in a direction opposite to the first speed for a first time period, and moving the first tracks and the second tracks along a third direction that is perpendicular to the first and the second direction such that the first tracks but not the second tracks can contact the object; and driving the plurality of second movable members to translocate the object along the second direction and in a direction opposite to the second speed for a second time period, and moving the first tracks and the second tracks along a third direction that is perpendicular to the first and the second direction such that the second tracks but not the first tracks can contact the object.

2. The method of claim 1, wherein the first direction and the second direction are perpendicular to each other, wherein:

in the driving the plurality of first movable members to translocate the object along the first direction and in a direction opposite to the first speed for a first time period, the plurality of first movable members are driven to translocate the object at a speed of $2V*\cos\alpha$, and in the driving the plurality of second movable members to translocate the object along the second direction and in a direction opposite to the second speed for a second time period, the plurality of second movable members are driven to translocate the object at speed of $2V*\sin\alpha$, wherein:

V is the pace of the object, $\alpha$ is an angle between a direction of the pace of the object and the first direction, wherein, $0\leq\alpha\leq 90°$; and the first time period and the second time period are substantially same.

3. The method of claim 1, wherein at least one of each first movable member and each second movable member comprises a spherical body, configured to move over the omnidirectional motion platform to thereby translocate the object thereon.

4. The method of claim 3, wherein both each first movable member and each second movable member comprise a spherical body, wherein:

the driving a plurality of movable members of the omnidirectional motion platform to translocate the object based on the speeds along the at least two directions comprises:

alternately driving the spherical bodies to move along the first direction in a direction opposite to the first speed and to move along the second direction in a direction opposite to the second speed.

5. An omnidirectional motion apparatus, comprising an omnidirectional motion platform, a pace detector, and a data processor, wherein:

the pace detector is configured to detect, and send to the data processor, a pace of an object moving over the omnidirectional motion platform;

the data processor is coupled to both the pace detector and the omnidirectional motion platform and is configured to decompose the pace of the object into speeds along at least two directions;

the omnidirectional motion platform comprises at least two pluralities of movable members and a driving device, wherein the driving device is configured, based on the speeds along the at least two directions, to drive each of the at least two pluralities of movable members to translocate the object along one of the at least two directions and in a direction opposite to a corresponding speed such that the object remains at a substantially same place over the omnidirectional motion apparatus, wherein:

the speeds along the at least two directions comprise a first speed along a first direction and a second speed along a second direction, wherein the second direction is nonparallel with the first direction, and the at least two pluralities of movable members comprise:

a plurality of first movable members, configured to translocate the object along the first direction and in a direction opposite to the first speed; and a plurality of second movable members, configured to translocate the object along the second direction and in a direction opposite to the second speed;

at least one of each first movable member and each second movable member comprises a track, configured such that a portion of the track can move over the omnidirectional motion apparatus to thereby translocate the object in contact therewith; and each first movable member comprises a first track, and each second movable member comprises a second track, wherein the driving device comprises a first rotor, a second rotor and a position actuator, and wherein:

the first rotor is configured to drive each first track such that a portion of the each first track in contact with the object can move along the first direction;

the second rotor is configured to drive each second track such that a portion of the each second track in contact with the object can move along the second direction; and the position actuator is configured to adjust positions of each first track and each second track along a third direction perpendicular to the first direction and the second direction to thereby control alternate contact of the each first track or the each second track with the object.

6. The omnidirectional motion apparatus of claim 5, wherein:

the plurality of first movable members are further configured to translocate the object along the second direction; and the plurality of second movable members are further configured to translocate the object along the first direction.

7. The omnidirectional motion apparatus of claim 5, wherein the omnidirectional motion platform further comprises a conveying trough and a motion platform base, wherein:

the motion platform base is configured to provide a surface for the plurality of first movable members and the plurality of second movable members to move thereover to thereby translocate the object; and the plurality of first movable members and the plurality of second movable members are configured to move back and forth between the conveying trough and the motion platform base.

8. The omnidirectional motion apparatus of claim 5, wherein the driving device comprises a first driving sub-device and a second driving sub-device, wherein:

the first driving sub-device is configured to drive the plurality of first movable members to move along the first direction over the motion platform base; and the second driving sub-device is configured to drive the second movable members to move along the second direction over the motion platform base.

9. The omnidirectional motion apparatus of claim 5, wherein at least one of each first movable member and each second movable member comprises a spherical body.

10. The omnidirectional motion apparatus of claim 5, wherein the position actuator comprises a driving motor, a first connecting rod, and a second connecting rod, wherein:

each first track and each second track are respectively mounted over the first connecting rod and the second connecting rod;

the first connecting rod and the second connecting rod are each coupled to the driving motor; and the driving motor is configured to drive the first connecting rod and the second connecting rod to move along the third direction to thereby control alternate contact of the each first track or the each second track with the object.

11. The omnidirectional motion apparatus of claim 5, wherein the first tracks and the second tracks are arranged in an array.

12. A motion system, comprising the omnidirectional motion apparatus according to claim 5.

* * * * *